United States Patent
Friederichs et al.

(10) Patent No.: US 9,820,432 B2
(45) Date of Patent: Nov. 21, 2017

(54) BEET PULLER SHARE

(71) Applicant: Betek GmbH & Co. KG, Aichhalden (DE)

(72) Inventors: Heiko Friederichs, Aichhalden (DE); Florian Smeets, Baiersbronn (DE)

(73) Assignee: Betek GmbH & Co. KG, Aichhalden (DE)

(*) Notice: Subject to any disclaimer, the term of this patent is extended or adjusted under 35 U.S.C. 154(b) by 55 days.

(21) Appl. No.: 14/881,518

(22) Filed: Oct. 13, 2015

(65) Prior Publication Data

US 2016/0037715 A1 Feb. 11, 2016

Related U.S. Application Data

(63) Continuation of application No. PCT/EP2014/056251, filed on Mar. 28, 2014.

(30) Foreign Application Priority Data

May 10, 2013 (DE) .................. 10 2013 104 836

(51) Int. Cl.
*A01D 25/02* (2006.01)
*A01D 25/00* (2006.01)

(52) U.S. Cl.
CPC .............. *A01D 25/02* (2013.01); *A01D 25/00* (2013.01)

(58) Field of Classification Search
CPC ....... A01D 25/00; A01D 25/005; A01D 25/02

(Continued)

(56) References Cited

U.S. PATENT DOCUMENTS 1,976,268 A * 10/1934 Reynolds ............... A01B 15/06
                                                       172/719
2,018,183 A * 10/1935 Lundgren ............... A01D 25/02
                                                       171/103

(Continued)

FOREIGN PATENT DOCUMENTS

DE         40 25 016 A1     2/1992
FR         2 378 435 A1     8/1978

(Continued)

OTHER PUBLICATIONS

English translation of International Preliminary Report on Patentability (Application No. PCT/EP2014/056251) dated Nov. 19, 2015.

(Continued)

*Primary Examiner* — John G Weiss
(74) *Attorney, Agent, or Firm* — Burr & Brown, PLLC

(57) ABSTRACT

The invention relates to a beet puller share having a base part which comprises a cutting edge, wherein one or several hard material elements which form deflecting faces on their top surfaces are arranged in the region of the cutting edge, wherein the deflecting faces transition into a surface region of the base part, and wherein the surface region forms a beet guiding zone, in particular, a beet ejecting zone. To improve the service life of the beet puller share and to improve the harvest yield connected therewith, it is provided according to the invention that the hard material elements are realized as cutting elements which form the cutting edge at least in regions and that the deflecting face of at least one cutting element is convexly curved and merges into the convexly curved beet guiding zone, in particular, beet ejecting zone.

13 Claims, 3 Drawing Sheets

(58) Field of Classification Search
USPC .............................. 56/327.1; 171/55, 59, 50
See application file for complete search history.

(56) References Cited

U.S. PATENT DOCUMENTS

| | | | | | |
|---|---|---|---|---|---|
| 2,063,688 | A | * | 12/1936 | Lier ........................ | A01B 15/06 172/719 |
| 2,154,973 | A | * | 4/1939 | Chibnik ................. | A01B 15/06 172/754 |
| 2,534,889 | A | * | 12/1950 | Walz .................... | A01D 25/005 171/21 |
| 2,562,674 | A | * | 7/1951 | Lea ........................ | A01D 25/02 171/53 |
| 2,724,317 | A | * | 11/1955 | Zwaska .................. | A01B 15/04 172/753 |
| 3,554,296 | A | * | 1/1971 | Lehman ................. | A01B 13/14 172/700 |
| 5,119,888 | A | | 6/1992 | Hall | |

FOREIGN PATENT DOCUMENTS

| | | | |
|---|---|---|---|
| FR | EP 0780049 A1 * | 6/1997 | ........... A01D 25/005 |
| FR | 2 958 493 A1 | 10/2011 | |
| FR | 2 971 115 A1 | 8/2012 | |

OTHER PUBLICATIONS

International Search Report (Application No. PCT/EP2014/056251) dated Aug. 5, 2014.

\* cited by examiner

BEET PULLER SHARE

CROSS REFERENCE TO RELATED APPLICATIONS

This application is a continuation of International Application No. PCT/EP2014/056251 filed Mar. 28, 2014, which designated the United States, and claims the benefit under 35 USC §119(a)-(d) of German Application No. 10 2013 104 836.6 filed May 10, 2013, the entireties of which are incorporated herein by reference.

FIELD OF THE INVENTION

The invention relates to a beet puller share, having a base part which comprises a cutting edge, wherein hard material elements, which form deflecting faces on their upper surfaces, are arranged in the region of the cutting edge and wherein the surface region forms a beet guiding zone, in particular, a beet ejecting zone.

BACKGROUND OF THE INVENTION

Such beet puller shares are used during beet harvesting. They are mounted in each case in pairs placed opposite one another on a tool carrier of a harvesting machine. A tapering gap region is formed between the two beet puller shares. The beet puller shares cut into the soil on both sides of a beet to be lifted and release the roots thereof. The beet is then lifted out of the soil via the tapering gap. The beet puller shares form in each case a beet ejecting zone in which the beet is ejected completely out of the ground and is then conveyed into a storage hopper. Due to the cutting operation in the soil and to the sliding of the beet along the surface regions of the base part provided for this purpose, the base part is subject to abrasive wear. It is now known from the prior art to provide armoring, consisting of hard material elements, in the region of the cutting edge in order to limit the wearing processes. It has been shown that on account of washing-out operations in the transition region between the hard material elements and the base part, sharp-edged deposits are created the longer the share is in use. In this case, the beet is bruised as it is conveyed past, which has a disadvantageous effect on the quality of the harvest.

SUMMARY OF THE INVENTION

It is the object of the invention to provide a beet puller share of the type mentioned in the introduction by way of which an improved harvest yield is possible.

An object of the present invention is achieved as a result of hard material elements being realized as cutting elements which form the cutting edge at least in regions. This results in an improved service life for the beet puller share. The base part is now protected directly by the cutting elements, in particular, in the heavily loaded cutting region. The cutting elements can maintain the sharp-edgedness of the cutting edge over a long period of use on account of their tool characteristics. There is also a positive influence on the necessary machine output in particular as a result.

According to a preferred variant of the present invention, the deflecting face of at least one cutting element may be curved in a convex manner and merge into the convexly curved beet guiding, in particular, beet ejecting zone. Improved flow both of the soil and of the recovered beet is achieved as a result of said geometry. The hard metal region merges into the curved region of the base part such that a clearance angle is produced in the transition region. Consequently, the base part is no longer exposed in the wear region. In addition, the risk of deposit formations on account of washing-out processes can also be suppressed to the greatest possible extent such that an improved harvest yield is possible.

A conceivable variant of the present invention provides that the beet guiding zone forms a separating line at least in the region of the beet ejecting zone, that the separating line is arranged in the region of the beet ejecting zone at a maximum spacing of 60 mm from the end of the operating face of the hard material application, in particular, from the cutting elements and/or that the angle between the separating line and a connecting line which connects the deflecting faces is smaller than 15°, wherein the angle opens in the direction toward the beet ejecting zone, or the separating line extends parallel to the connecting line at a spacing of less than 25 mm.

According to a preferred development of the present invention, it can be provided that a cutting edge carrier is angled from the base part toward the rear side of the base part. The cutting edge setting angle can be predefined by means of the angled cutting edge carrier. The volume of the hard material element can be realized in an optimized manner and consequently developed in a cost-efficient manner in this way.

According to one variant of the invention, it is advantageous for the realization of the cutting edge when the cutting edge is formed by a multitude of cutting elements which are arranged side by side in a gap-free manner in the joint region. Consequently, the cutting edge is segmented. This leads to a reduced risk of breakage of the cutting edge. Consequently, the operability of the beet puller share is maintained even in the event of shock-type loads which sometimes occur when contact is made in an unexpected manner with a stone.

To improve the cutting engagement, it can be provided that the row of cutting elements is closed at least in the region of a row end by way of a closure piece which forms an arcuate cutting region and wherein the arcuate cutting region merges into the linear cutting regions of the last connecting cutting element of the row of cutting elements. Wear optimization is also brought about as a result of this measure as the development of the cutting edge geometry is continuous in the region of the ends of the cutting edge. In addition, the arcuate development serves for protecting the beet from bruising when it is being ejected.

A particularly preferred variant of the invention is such that the base part is realized as a forged part and comprises a convexly curved top surface and a concavely curved bottom surface. In this way, there is a sturdy shell-like design which can be produced with little expenditure on material. The use of a forged part in conjunction with the shell-like design also enables the reliable removal of unexpectedly large operating forces. Elastic flexibility can be introduced into the tool system by means of the shell-like design. Load transfer is supported by the toughness of the forged part. The material thickness can be adapted to the wear region depending on the requirement as a result of the forged part.

In addition, it is conceivable for the beet puller share to comprise a description field on its base part in the region of the supporting face. In the assembled state, the supporting surface abuts against a counter face of the tool carrier. The description field is consequently protected from wear attack. It is possible then to identify the beet puller share easily during maintenance and exchange it for a non-worn beet puller share of the same type.

A reliable and fixed connection between the cutting element and the base part is achieved then when it is provided that the cutting element comprises a fastening piece which forms the deflecting face and which is connected to a cutting edge carrier of the base part in particular in a substance-to-substance bonding manner by way of its bottom surface, which is remote from the deflecting face. For example, it is possible to solder the cutting element, which consists of hard metal, to the base part.

A tool structure which is designed in a manner that is particularly wear-favorable is produced in a simple manner as a result of the convex deflecting face of the cutting element merging into the equally convexly curved cutting region, wherein the radius of curvature of the cutting region is preferably chosen to be within the range of between 0.5 mm and 3.5 mm. The curvature region enables sharp-edged ground penetration to the benefit of a reduction in the necessary machine output. In addition, sufficient resistance against cutting edge fracture is provided in this case.

In addition, it has been shown that the cutting elements are sufficiently fracture-proof, in particular even in harsh operating conditions, when they comprise an extension within the range of between 10 mm and 50 mm in the longitudinal direction of the cutting region and the extension transversely with respect to the longitudinal direction of the cutting region is chosen to be within the range of between 20 mm and 60 mm.

BRIEF DESCRIPTION OF THE DRAWINGS

The invention is explained in more detail below by way of an exemplary embodiment shown in the drawings, in which.

DETAILED DESCRIPTION OF THE INVENTION

Figure 1:
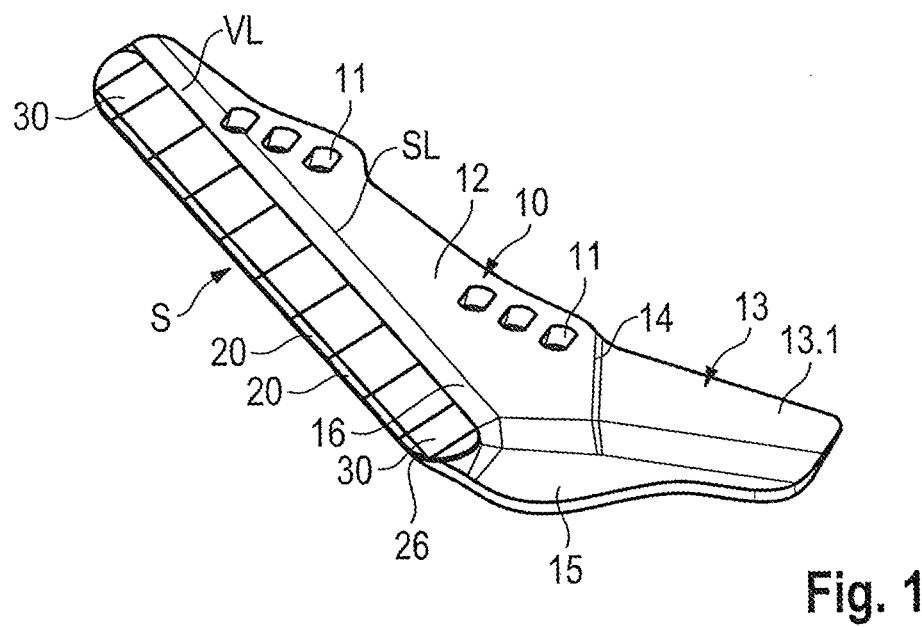
FIG. 1 shows a front view in perspective of a beet puller share.
Figure 7:
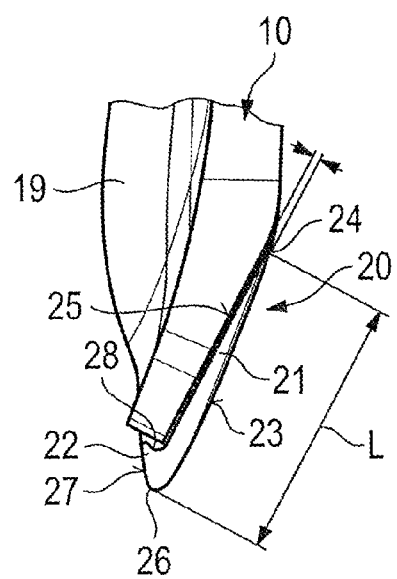
FIG. 7 shows an enlarged representation of a detail marked in FIG. 6 by the reference VII.

FIG. 1 shows a beet puller share having a base part 10 which is produced as a forged part from a steel material. The base part 10 is provided with two rows of fastening receiving means 11 in a fastening region. The fastening receiving means 11 of each row are arranged equally spaced apart from another. A cutting edge carrier 16 is provided in the region of a longitudinal edge of the base part 10. This is angled toward the rear surface of the base part 10, in particular is bent at a large radius. The cutting edge carrier 16 is equipped with a row of cutting elements 20. The cutting elements 20 consist of a hard substance, in particular a hard metal or a ceramic material. In order to provide a uniform supporting surface for the cutting elements 20, the cutting edge carrier 16 is provided with a flat shoulder, as can be seen in FIG. 7. It can also be seen in FIG. 1 that the row of cutting elements 20 is provided with closure pieces 30 at its two longitudinal ends.

Connecting to the cutting edge carrier 16, the base part 10 forms a beet guiding region with a beet ejecting zone 12. In the region of the beet ejecting zone 12, the base part 10 is curved in a convex manner. A rounded bulge is used in the present case. Connecting to the beet ejecting zone 12, the base part 10 merges into an attachment 13 via a shoulder-like transition portion 14. The attachment 13 forms a guide face 13.1. An angled inclined face 15 is provided in the transition region between the row of cutting elements 20 and the attachment 13.

Figure 4:
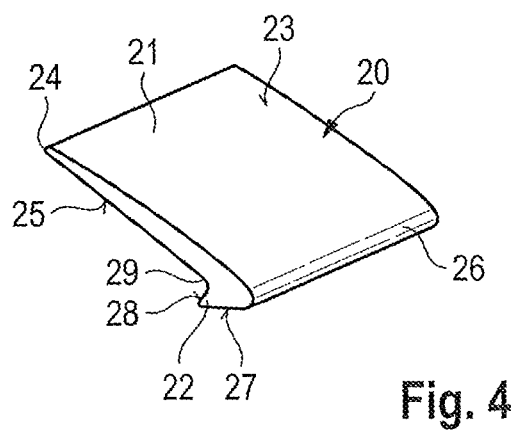
FIG. 4 shows a perspective representation of a cutting element of the beet puller share according to FIGS. 1 to 3.
Figure 5:
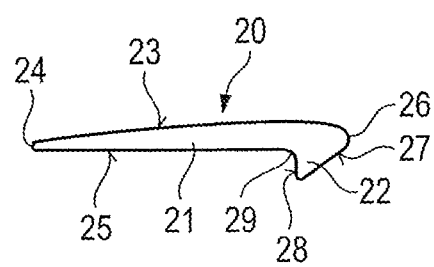
FIG. 5 shows a side view of the cutting element according to FIG. 4.

The development of the cutting elements 20 is explained in more detail below with reference to FIGS. 4 and 5. As shown in these representations, the cutting elements 20 comprise a fastening piece 21. A fastening piece forms a convexly curved deflecting face 23 on its top surface. The bottom surface 25 of the cutting element 20 remote from the deflecting face 23 is realized in a level manner. The deflecting face 23 merges into the convex cutting region 26 which is realized in a linear manner. An attachment 22, which protrudes at the back beyond the bottom surface 25, is integrally molded in one piece onto the fastening piece 21. An attachment 22 is provided with a free face 27 connecting to the rounded cutting region 26. The free face 27 merges in an angular manner into a support face 28. The support face 28, in turn, merges into the bottom surface 25 via a curved transition 29. The bottom surface 25 is transferred into the deflecting face 23 via a rounded end portion 24.

Figure 2:
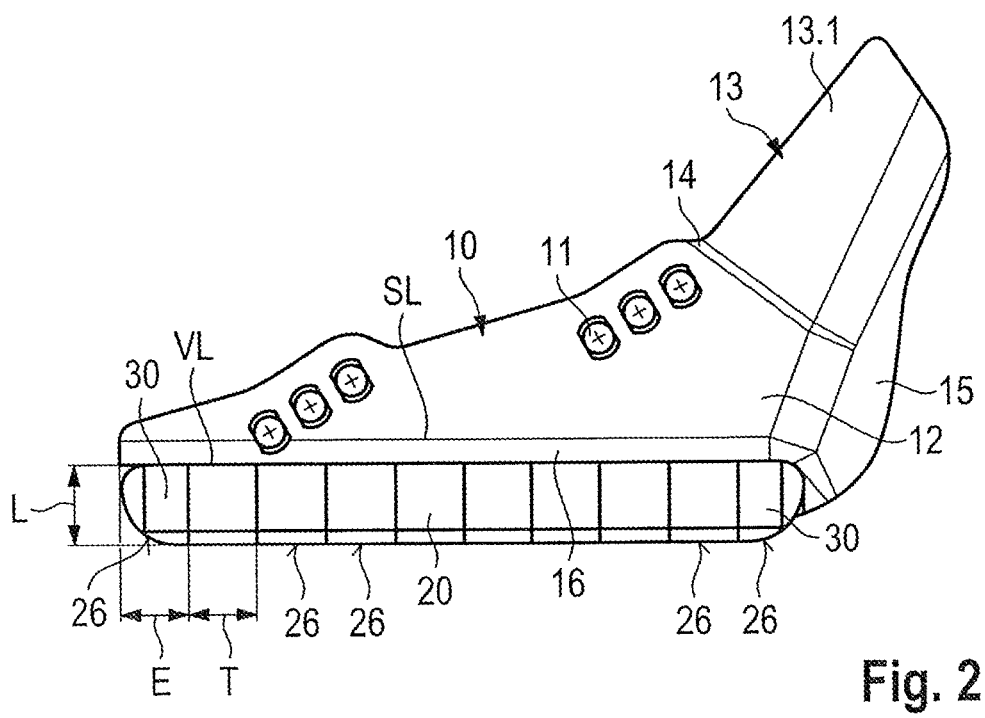
FIG. 2 shows a front view of the beet puller share according to FIG. 1.

As can be seen in FIG. 2, a plurality of structurally identical cutting elements 20 are placed onto the cutting edge carrier 16 and are positioned side by side in a gap-free manner. The cutting elements 20 all comprise the identical longitudinal extension T in the direction of their cutting regions 26. Transversely with respect to the longitudinal extension T, the overall length of the deflecting face 23 is specified in FIG. 2 by way of the measurement L.

As has already been mentioned above, the row of cutting elements 20 is closed by way of end pieces 30 at its longitudinal ends. The closure pieces 30 comprise, in principle, the identical method of construction as the cutting elements 20 and accordingly include a fastening piece 21 with an attachment 22 and convexly curved deflecting faces 23. They have a rounded end portion 24 and a level bottom surface 25 by way of which they are placed onto the cutting edge carrier 16. The attachment 22 forms a cutting region 26 and a free face 27. In addition, the attachment 22 includes a support face 28 which transitions into the bottom surface 25 via a curved transition 29. In contrast to the previously described cutting elements 20, as can be seen clearly in FIG. 2, the cutting region 26 of the closure pieces 30 is now not realized in a linear manner, but comprises an at least partially convex arcuate development. The convex development of the cutting region 26 is transitioned in a flush manner into the linear cutting region 26 of the connecting cutting element 20.

Figure 6:
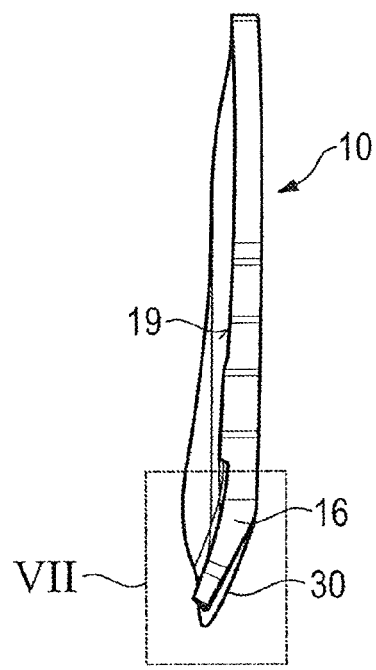
FIG. 6 shows a view from the left of the beet puller share according to FIG. 2.

The assignment of the closure pieces 30 to the base part 10 can be seen in more detail in FIGS. 6 and 7. As shown in this representation, the closure pieces 30 are placed with their bottom surfaces 25 and the support faces 28, with the interposition of a substance-to-substance bonding connection, in particular a solder material, onto corresponding counter faces of the base part 10 and here are connected to the same. The fastening of the cutting elements 20 is effected in an analogous manner. Here too, the cutting elements 20 are soldered to the base part by way of the bottom surfaces 25 and the support faces 28. In the assembled state, the convex deflecting faces 23 of the cutting elements 20 and of the end pieces 30 transition in a flush manner into the connecting guide regions of the base part 10. In this case, the guide regions of the base part 10 are also realized in a convex manner. It can be seen from FIG. 1 that the rear part, in the infeed direction, of the row of cutting elements 20 are transferred into the convex beet ejecting zone 12 by way of their deflecting faces 23.

The shell-like design of the beet puller share can also be seen clearly from FIGS. 6 and 7. Accordingly, the beet puller share is provided with a concavely troughed inside face 19 on the bottom surface and, located opposite, is convexly bulging on the outside surface.

Figure 3:
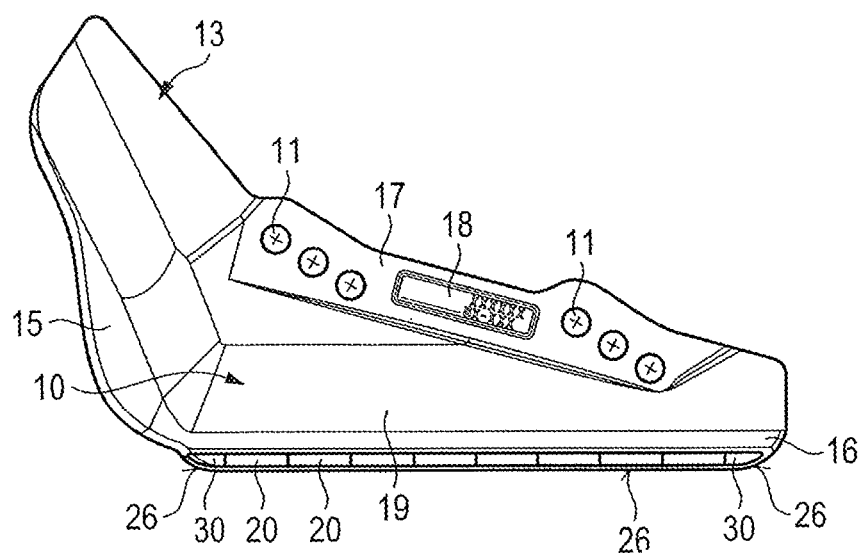
FIG. 3 shows a view from behind of the beet puller share according to FIGS. 1 and 2.

FIG. 3 clearly shows the rear view of the beet puller share. As this representation illustrates, both the inclined face 15 and the cutting edge carrier 16 are angled toward the rear side in relation to the base part 10. A fastening face 17 is provided in the region of the rear surface of the beet puller share. The fastening receiving means 11 open out into the fastening face 17. In this case, the fastening face 17 is aligned spatially in such a manner that it stands at an angle equal to 90° with respect to the center longitudinal axes of the fastening receiving means 11.

For fastening the beet puller share, the beet puller share is placed onto a counter face of a tool carrier by way of its fastening face 17. The beet puller share is then screw-connected to the tool carrier using in each case one fastening receiving means 11 of the rows of fastening receiving means 11. In this case, the beet puller share has a defined setting angle in relation to the tool carrier. If then the assignment is to be varied, the beet puller share is displaced in relation to the tool carrier and is then screw-connected to the tool carrier using one of the next fastening receiving means 11 of the rows of fastening receiving means 11. With reference to its alignment, it is possible to adapt the beet puller share to the respective requirements by using this simple measure.

A description field 18, on which the model of the beet puller share is marked, is provided in the region of the fastening face 17. For example, the description field 18 can be a stamp-like embossing.

The invention claimed is:

1. A beet puller share having a base part which comprises a cutting edge, wherein a hard material application, which comprises one or several deflecting faces on its top surface arranged in a region of the cutting edge,
   wherein the one or several deflecting faces transition into a surface region of the base part
   wherein said surface region forms a beet guiding zone, the beet guiding zone including a beet ejecting zone, wherein the hard material application comprises at least one hard material element which comprises at least one cutting element, the at least one cutting element defining the cutting edge at least in the region of the cutting edge, and
   wherein the base part, connecting to the beet ejecting zone defines a convex rounded bulge.

2. The beet puller share as claimed in claim 1, wherein the one or several deflecting faces of at the least one cutting element is curved in a convex manner and merges into the beet guiding zone, including the beet ejecting zone.

3. The beet puller share as claimed in claim 1, wherein the beet guiding zone forms a separating line at least in a region of the beet ejecting zone, in that the separating line is arranged in the region of the beet ejecting zone at a maximum spacing of 60 mm from the one or several deflecting faces of the hard material application, comprising the at least one cutting element, wherein an angle between the separating line and a connecting line which connects the deflecting faces is smaller than 15°, and wherein the angle opens in a direction toward the beet ejecting zone, or the separating line extends parallel to the connecting line at a spacing of less than 25 mm.

4. The beet puller share as claimed in claim 1, wherein the cutting edge is angled from the base part to the rear side of the base part.

5. The beet puller share as claimed in claim 1, wherein the cutting edge is formed by a multitude of cutting elements which are arranged side by side in a gap-free manner in the region of the cutting edge.

6. The beet puller share as claimed in claim 5, wherein a row of cutting elements is closed at least in a region of a row end by way of a closure piece which forms an arcuate cutting region and wherein the arcuate cutting region merges into a linear cutting region of a last connecting cutting element of the row of cutting elements.

7. The beet puller share as claimed in claim 1, wherein the base part comprises a forged part having a convexly curved top surface and a concavely curved bottom surface.

8. The beet puller share as claimed in claim 1, wherein the base part comprises a description field in a region of the fastening face.

9. The beet puller share as claimed in claim 1, wherein the cutting element comprises a fastening piece which forms the deflecting face and which is connected to a cutting edge carrier of the base part in a substance-to-substance bonding manner by way of its bottom surface, which is remote from the deflecting face.

10. The beet puller share as claimed in claim 1, wherein a fastening piece of the cutting element comprises an attachment which forms the cutting edge and protrudes at least in regions beyond a bottom surface of the fastening piece.

11. The beet puller share as claimed in claim 1, wherein a convex deflecting face of the cutting element merges into an equally convexly curved cutting region, wherein the radius of curvature of the cutting region is preferably within the range of between 0.5 mm and 3.5 mm.

12. The beet puller share as claimed in claim 1, wherein an extension of the cutting element in a longitudinal direction of the cutting region is one of within a range of between 10 mm and 50 mm and extends transversely with respect to the longitudinal direction of the cutting region within a range of between 20 mm and 60 mm.

13. A beet puller share having a base part which comprises a cutting edge, wherein a hard material application, which comprises a deflecting face on its top surface, is arranged in a region of the cutting edge,
   wherein the deflecting face transitions into a surface region of the base part,
   wherein said surface region forms a beet guiding zone, the beet guiding zone including a beet ejecting zone, wherein the hard material application comprises hard material elements which comprise cutting elements and which form the cutting edge at least in regions,
   wherein the cutting edge is formed by a plurality of cutting elements which are arranged side by side in a gap-free manner in the region of the cutting edge,
   wherein a row of the cutting elements is closed at least in a region of an end of the row by a closure piece which forms an arcuate cutting region, and wherein the arcuate cutting region merges into a linear cutting region of the last connecting cutting element of the row of cutting elements.

* * * * *